United States Patent
Berger et al.

(10) Patent No.: US 6,553,406 B1
(45) Date of Patent: Apr. 22, 2003

(54) PROCESS THREAD SYSTEM RECEIVING REQUEST PACKET FROM SERVER THREAD, INITIATING PROCESS THREAD IN RESPONSE TO REQUEST PACKET, SYNCHRONIZING THREAD PROCESS BETWEEN CLIENTS-SERVERS.

(75) Inventors: Kenneth A. Berger, Garland, TX (US); Larry J. Turner, Carrollton, TX (US); Andrew E. Wilcox, Dallas, TX (US)

(73) Assignee: Prelude Systems, Inc., Addison, TX (US)

(*) Notice: Subject to any disclaimer, the term of this patent is extended or adjusted under 35 U.S.C. 154(b) by 347 days.

(21) Appl. No.: 09/631,469

(22) Filed: Aug. 3, 2000

(51) Int. Cl.[7] .............................................. G06F 17/30
(52) U.S. Cl. ..................... 709/203; 709/248; 709/250; 709/230; 709/314; 707/10; 713/201
(58) Field of Search ................................ 709/203–245, 709/313–315, 330, 247–250, 230–231, 314; 713/200–202; 707/1–10, 100–104.1, 200–205

(56) References Cited

U.S. PATENT DOCUMENTS

| | | | | |
|---|---|---|---|---|
| 5,737,531 A | * | 4/1998 | Ehley ........................ 709/208 |
| 5,884,022 A | * | 3/1999 | Callsen et al. ................ 714/22 |
| 5,968,120 A | * | 10/1999 | Guedalia ..................... 345/428 |
| 6,026,428 A | * | 2/2000 | Hutchison et al. .......... 709/100 |
| 6,085,217 A | * | 7/2000 | Ault et al. ................... 709/100 |
| 6,131,118 A | * | 10/2000 | Stupek et al. ............... 709/223 |
| 6,226,689 B1 | * | 5/2001 | Shah et al. .................. 709/314 |
| 6,240,440 B1 | * | 5/2001 | Kutcher ....................... 709/102 |
| 6,260,077 B1 | * | 7/2001 | Rangarajan et al. ........ 709/107 |
| 6,324,492 B1 | * | 11/2001 | Rowe .......................... 370/241 |
| 6,330,589 B1 | * | 12/2001 | Kennedy ................. 707/104.1 |
| 6,427,161 B1 | * | 7/2002 | LiVecchi ..................... 709/102 |
| 6,438,602 B1 | * | 8/2002 | Lane ........................... 709/230 |

FOREIGN PATENT DOCUMENTS

EP            0817015       * 1/1998  ...................... 9/46

* cited by examiner

Primary Examiner—Srirama Channavajjala
(74) Attorney, Agent, or Firm—Christopher J. Rourk; Akin Gump Strauss Hauer & Feld, LLP

(57) ABSTRACT

A system for facilitating data communications between a client and a server is provided. The system includes a server thread system that receives client logon data and a request packet. The server thread system maintains a client process while the client is logged on to the server that allows the state of client-server communications to be determined. The system also includes a process thread system that is connected to the server thread system. The process thread system receives process initiation data from the server thread system and initiates a process in response to the process initiation data.

20 Claims, 5 Drawing Sheets

PROCESS THREAD SYSTEM RECEIVING REQUEST PACKET FROM SERVER THREAD, INITIATING PROCESS THREAD IN RESPONSE TO REQUEST PACKET, SYNCHRONIZING THREAD PROCESS BETWEEN CLIENTS-SERVERS.

FIELD OF THE INVENTION

The present invention pertains to the field of communications between clients and servers. More specifically, the invention relates to a system and method for client-server communications that provides for the creation and management of state information for the client-server communications.

BACKGROUND

Client-server communications systems and methods are known in the art. These known client-server communications systems typically involve the client sending the server a request for information, and the server fulfilling the request for information. Thus, whenever information is required, the client must initiate the request for information, and the server then fulfills the request and consequently proceeds with processing other requests without storing any information regarding the request previously processed for the client.

One drawback with known systems and methods for client-server communications is that such communications are stateless. After the client submits a request, then the client must wait for the server to reply. Likewise, after the server has replied, the server typically does not store any data relating to providing the information for the client. Because of this structure, it often occurs that a client will submit a request for information to the server and may not receive any response from a server for the information, such as because of communications errors, server load, or other reasons.

An additional drawback with existing systems and methods for client-server communications is that they require all information requests to be initiated by the client. Thus, the server cannot provide information to a client, even in situations where the client is active and awaiting such data.

SUMMARY OF THE INVENTION

In accordance with the present invention, a system and method for client-server communications are provided that overcome known problems with client-server communications.

In particular, a system and method for client-server communications are provided that allow the state of the client and server communications to be determined and used to facilitate client-server communications.

In accordance with an exemplary embodiment of the present invention, a system for facilitating data communications between a client and a server is provided. The system includes a server thread system that receives client logon data and a request packet. The server thread system maintains a client process while the client is logged on to the server that allows the state of client-server communications to be determined. The system also includes a process thread system that is connected to the server thread system. The process thread system receives the request packet from the server thread system and initiates a process in response to the request packet.

The present invention provides many important technical advantages. One important technical advantage of the present invention is a system and method for client-server communications that allows the state of client-server communications to be determined. The present invention utilizes a server thread process for determining the state of the client, and process thread processes for determining the state of processing of data requests from clients. The present invention thus uses realtime processes to track state in client-server communications.

Those skilled in the art will further appreciate the advantages and superior features of the invention together with other important aspects thereof on reading the detailed description that follows in conjunction with the drawings.

DETAILED DESCRIPTION OF PREFERRED EMBODIMENTS

Figure 1:
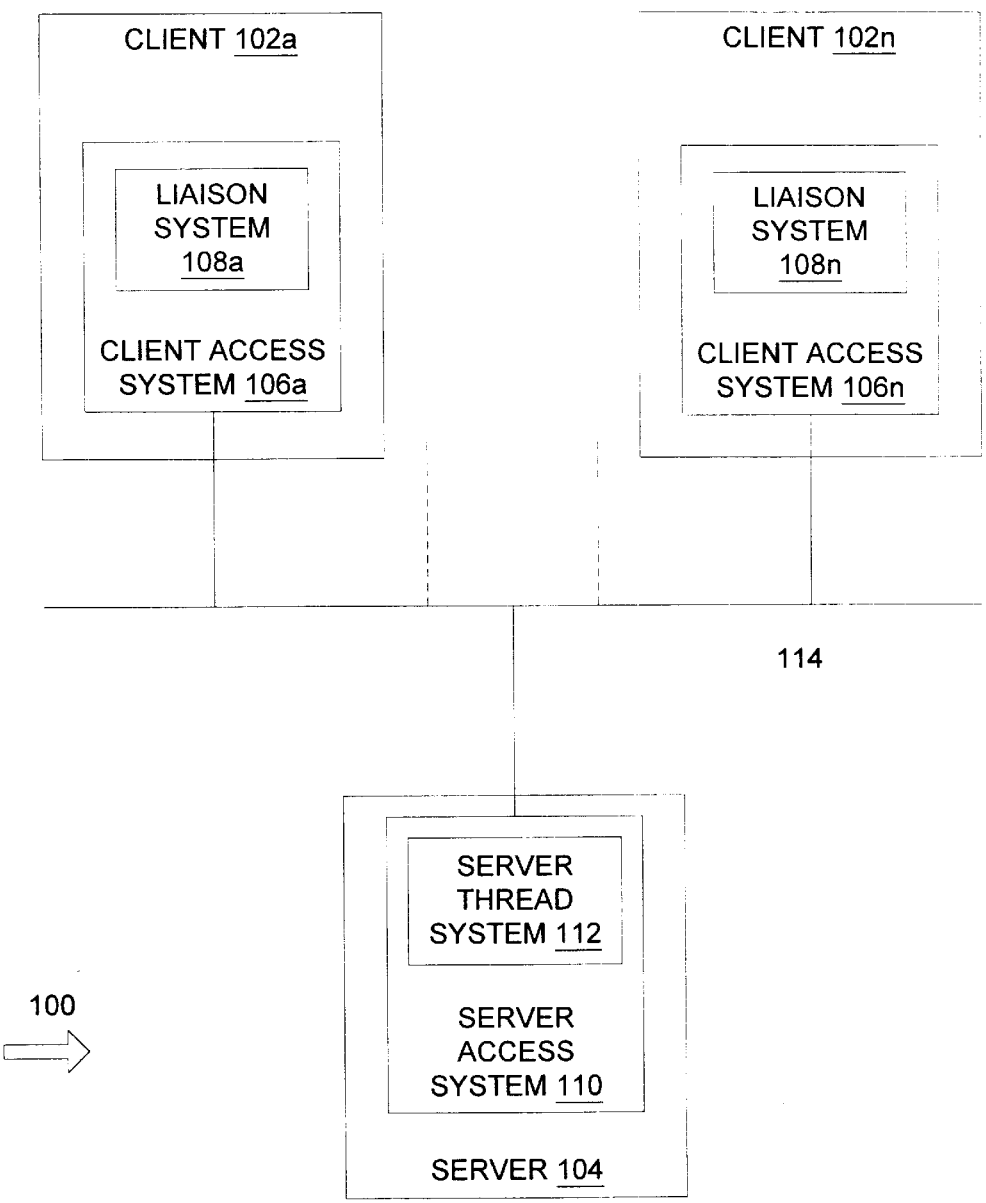
FIG. 1 is a diagram of a system for providing client-server communications in accordance with an exemplary embodiment of the present invention.

In the description that follows, like parts are marked throughout the specification and drawings with the same reference numerals, respectively. The drawing figures might not be to scale, and certain components can be shown in generalized or schematic form and identified by commercial designations in the interest of clarity and conciseness.

FIG. 1 is a diagram of a system 100 for providing client-server communications in accordance with an exemplary embodiment of the present invention. System 100 allows information about the state of the client to be obtained and maintained by the server, thus facilitating communications between the client and the server.

System 100 includes clients 102a through 102n, which are coupled to server 104 through communications medium 114. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. In one exemplary embodiment, systems and components are coupled to other systems and components through intervening systems and components, such as through an operating system of a general purpose computing platform.

Client systems 102a through 102n can be implemented in hardware, software, or a suitable combination of hardware and software, and can be one or more software systems operating on a Java virtual machine. As used herein, a software system can include one or more objects, agents, threads, lines of code, subroutines, separate software applications, two or more lines of code in two or more corresponding software applications, databases, or other suitable software architectures. In one exemplary embodiment, a software system can include one or more lines of code in a general purpose software application, such as an operating system, and one or more lines of software in a specific purpose software application.

Clients 102a through 102n include client access systems 106a through 106n and liaison systems 108a through 108n, respectively. Client access systems 106a through 106n each provide for communications between server 104 and clients 102a through 102n, respectively. In particular, client access systems 106a through 106n interface with liaison systems 108a through 108n such that the clients 102a through 102n, respectively, only need to interface directly with liaison systems 108a through 108n, and do not have to interface with server 104. Liaison systems 108a through 108n interact with client access systems 106a through 106n, respectively, in order to provide communication services between clients 102a through 102n, respectively, and server 104.

Client access systems 106a through 106n can initiate and maintain communications state data for data requests transmitted from client 102a through 102n, respectively, to server 104. When clients 102a through 102n first initiate contact with server 104, server 104 can first determine whether updates are required for client access systems 106a through 106n, respectively. If such updates are required, then they are first downloaded and installed, such as through the use of Java Archive or "JAR" files. The liaison systems 108a through 108n are then used to interface with the operating system, web browser, or other suitable software systems operating on clients 102a through 102n, respectively, such that these systems do not need to interface directly with the server 104. In this manner, any updates or modifications to the software systems operating on clients 102a through 102n can be accommodated by modifications to the liaison systems 108a through 108n, and do not need to be accommodated by modifications to server 104.

Server 104 can be implemented in hardware, software, or a suitable combination of hardware and software, and can be one or more software systems operating on a general purpose server platform. Server 104 includes server access system 110 and server thread system 112. Access between clients 102a and 102n and server 104 is provided for server 104 by server access system 110. Server thread system 112 is used to maintain state information for each of clients 102a through 102n. When a client logs on to server 104, a thread process, such as a Java thread process, is initiated for that client, such that the state of communications with each client can be determined. Thus, if a process operating on server 104 requires notification to a client 102a through 102n, then server 104 can determine whether that client is operational and can use the server thread for that client to initiate data communications with the client.

Server 104 can provide suitable software and hardware services for clients 102a through 102n. Server access system 110 provides a communications interface to server 104 and clients 102a through 102n, such that any updates to software systems operating on server 104 can be accommodated by modifications to server access system 110, without regard to communications systems operating on clients 102a through 102n.

Communications medium 114 can be the Internet, a wireless communications medium, a public switched telephone network, a local area network, a wide area network, other suitable communications media, or suitable combinations of such communications media. Communications medium 114 allows data to flow between clients 102a through 102n and server 104. The data can be transmitted in the form of packets, such that a large number of clients 102a through 102n can access communications medium 114 to transmit and receive data packets.

In operation, system 100 allows state information about clients 102a through 102n to be maintained by server 104. In this manner, server 104 can access data stored on clients 102a through 102n, determine what data has previously been transmitted to client 102a through 102n, and perform other suitable data functions. System 100 thus provides state information for clients and servers in a manner that allows data communications between the server and the clients to be more efficient and effective.

Figure 2:
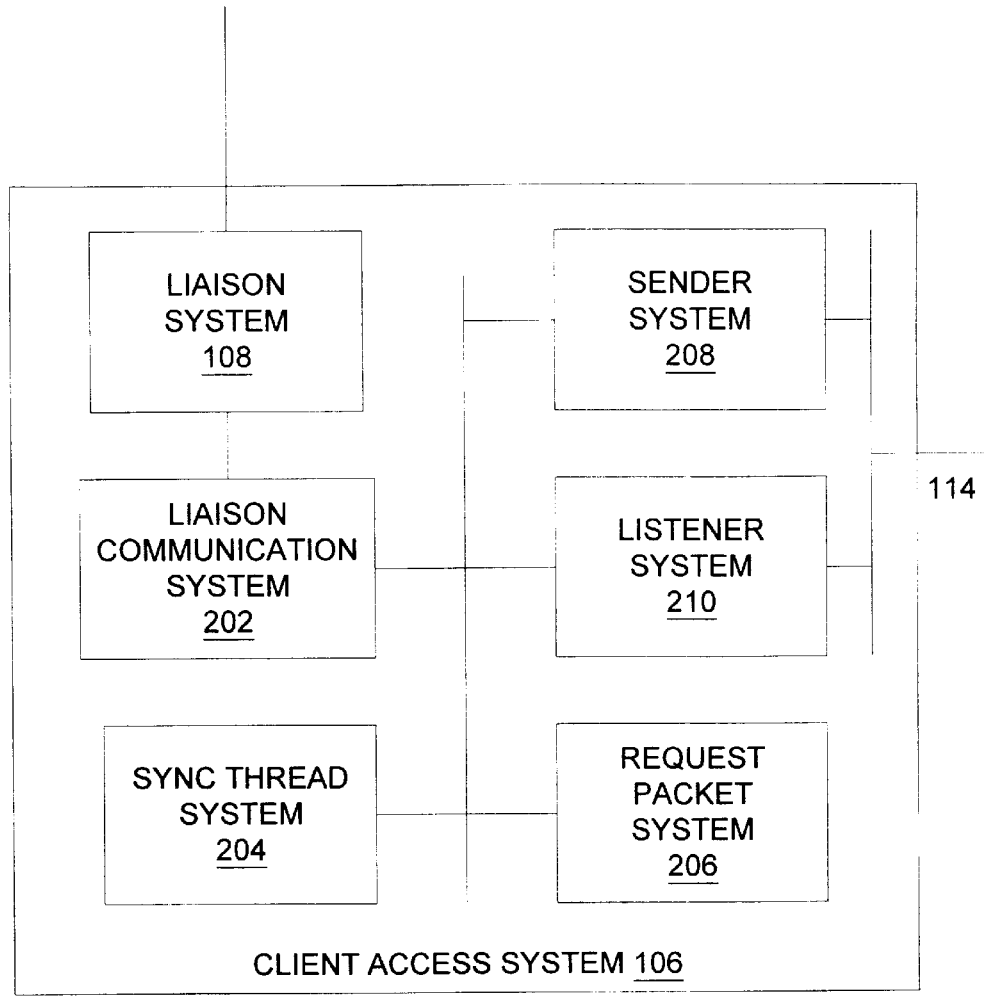
FIG. 2 is a diagram of a system for providing client access in accordance with an exemplary embodiment of the present invention.

FIG. 2 is a diagram of a system 200 for providing client access in accordance with an exemplary embodiment of the present invention. System 200 includes client access system 106, liaison system 108, liaison communications system 202, synchronization thread system 204, request packet system 206, sender system 208, and listener system 210, each of which can be implemented in hardware, software, or a suitable combination of hardware and software, and which can be one or more software systems operating on a Java virtual machine.

Liaison communications system 202 receives information requests from liaison system 108 and interfaces with synchronization thread system 204 to initiate a synchronization thread process, such as a Java thread process, to manage the information request so as to ensure that the information request is properly sent out, processed, and that a response to the information request is properly handled. Liaison communications system 202 also interfaces with request packet system 206 to compile the information request into a request packet, such as one or more data packets having predetermined header data formats, control data formats, payload data formats, and other suitable data structures.

Liaison communications system 202 then interfaces with sender system 208 to send the request packet to the server, and receives a response packet from the server at listener system 210. Liaison communications system 202 then interfaces with synchronization thread system 204 after the response packet has been received to close down the synchronization thread process, and provides the information in the response packet to liaison system 108 for use by the client 102. The response packet can also include control data or other suitable data that indicates that the response is not completed and that additional response packets are being transmitted. In this situation, the synchronization thread process will not be terminated until all response packets have been received. The response packets can also initiate the transmission of one or more additional request packets, and such request packets can transfer additional data that may be required in order for the server to provide all response data for the initial request data. The response packets can further include response packets generated when the server processes request packets for other clients, where the client is configured to receive and process such non-initiated response packets.

Synchronization thread system 204 can initiate a synchronization thread process upon receipt of a request packet initiation message from liaison communications system 202, and maintains the synchronization thread process running for that request packet until all response packets are received. Synchronization thread system 204 can maintain multiple synchronization threads for multiple request packets. Request packet system 206 receives the information from liaison system 108 that was subsequently provided to liaison communications system 202 and forms a request packet in response to the information that can include part or all of the information, plus header data, control data, and other suitable data.

Sender system 208 maintains data regarding the identity and address of the server, and can transmit request packets to the server. In one exemplary embodiment, sender system 208 maintains an Internet address for the server, and uses TCP/IP or other suitable Internet protocols to transmit request data packets to the server. Likewise, listener system 210 receives response packets from the server using TCP/IP protocols or other suitable data transmission protocols.

In operation, system 200 allows a client to request information from a server and further provides a uniform liaison interface for the client, such that systems operating on the client do not need to be configured to interface with the server. A synchronization thread system 204 is used to keep track of requests for information sent to the server, and a request packet system 206 is used to format the request in a manner that the server will receive. System 200 can be implemented in Java or other suitable programming languages and can be downloaded as a Java Archive file if the latest version of one or more components of system 200 is not present. In this manner, the software systems operating on the client do not have to be modified when a modification is made to system 200.

Figure 3:
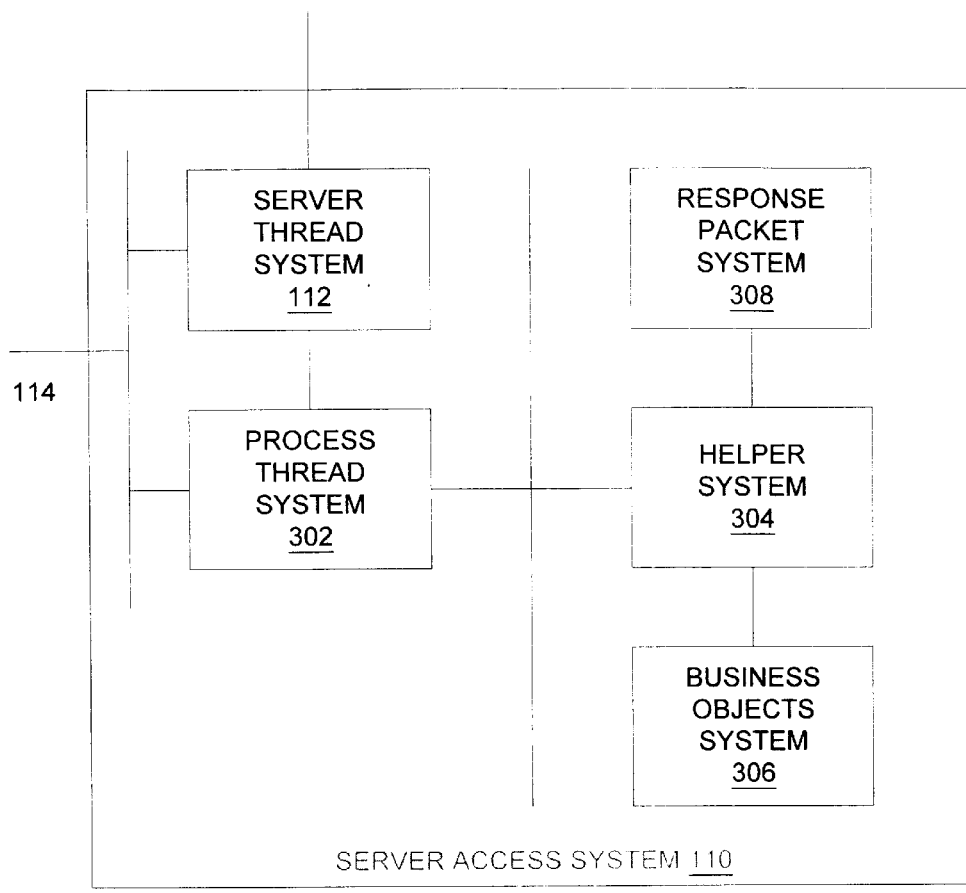
FIG. 3 is a diagram of a system for providing access to clients from a server in accordance with an exemplary embodiment of the present invention.

FIG. 3 is a diagram of a system 300 for providing access to clients from a server in accordance with an exemplary embodiment of the present invention. System 300 includes server thread system 112, process thread system 302, helper system 304, business objects system 306 and response packet system 308, each of which can be implemented in hardware, software, or a suitable combination of hardware and software, and which can be one or more software systems operating on a Java server.

Process thread system 302 is coupled to server thread system 112 and communications medium 114, and is used to initiate a process thread process in response to a request packet received from a client by server thread system 112. Process thread system 302 interfaces with helper system 304 after a request packet is received and provides helper system 304 with helper initiation data, such that a different process thread process can be used to manage each helper that is initiated through helper system 304. Likewise, a process thread process can initiate two or more helpers, where suitable, and can manage the two helpers as required to generate the response packet to the request packet. Process thread system 302 also receives a response packet from helper system 304 and can transmit the response packet to the client over communications medium 114.

Process thread system 302 can initiate a new process thread process for a new request packet in a scalable manner, such that a plurality of process thread processes can be supported. In this manner, process thread system 302 allows process thread processes to run in parallel so as to maximize the use of server computing resources.

Helper system 304 includes one or more helpers that can perform predetermined data processing functions. In one exemplary embodiment, helper system 304 can be used to implement an enterprise resource planning system, such that individual helper subsystems of helper system 304 provide general ledger functionality, inventory control functionality, order and sales and purchase order functionality, and other suitable functionality. Likewise, other systems can be implemented by helper system 304, such as online shopping systems, online reservation systems, and other suitable system functionality.

Helper system 304 receives data requests from process thread system 302 and interfaces with business objects system 306 to obtain information responsive to the request. Helper system 304 then assembles one or more response packets that include the information and other suitable data, such as header data and control data, by interfacing with response packet system 308. The information obtained by helper system 304 can also include other information, such as information related to the information request generated by the client, or information for other clients that have not submitted an information request. This information is then provided to response packet system 308 for formation of a suitable response packet.

Business objects system 306 includes a plurality of business objects that are used to obtain data in the server environment. In one exemplary embodiment, business objects system 306 includes objects that are used to interface with databases so as to obtain information from a variety of databases on one or more server platforms, objects that are used to translate between data formats, objects that are used to communicate between systems and components, objects that are used to report data to systems and components, and other suitable objects.

Response packet system 308 receives response data from helper system 304 and business objects system 306, and forms response packets from the data. The response packets can include header data, control data, payload data, and other suitable data. In one exemplary embodiment, the response packets can include data that identifies that a series of response packets are being generated, such that the client system will not terminate the synchronization thread process that is being used to track the corresponding data request. These response packets are then provided to process thread system 302, which provides the information to the client.

In operation, system 300 allows information received from a client at a server to be processed in parallel as one or more process threads. Each client and the process thread processes that are initiated for each client are managed using the server thread system 112. Each process thread process uses helper system 304 to perform functions that are required to respond to the request for information. The response data is formed into a response packet by response packet system 308, which is then provided to process thread system 302 for transmission to the client. Likewise, process thread system 302 can transmit data to other clients where the information returned from helper system 304 so requires.

Figure 4:
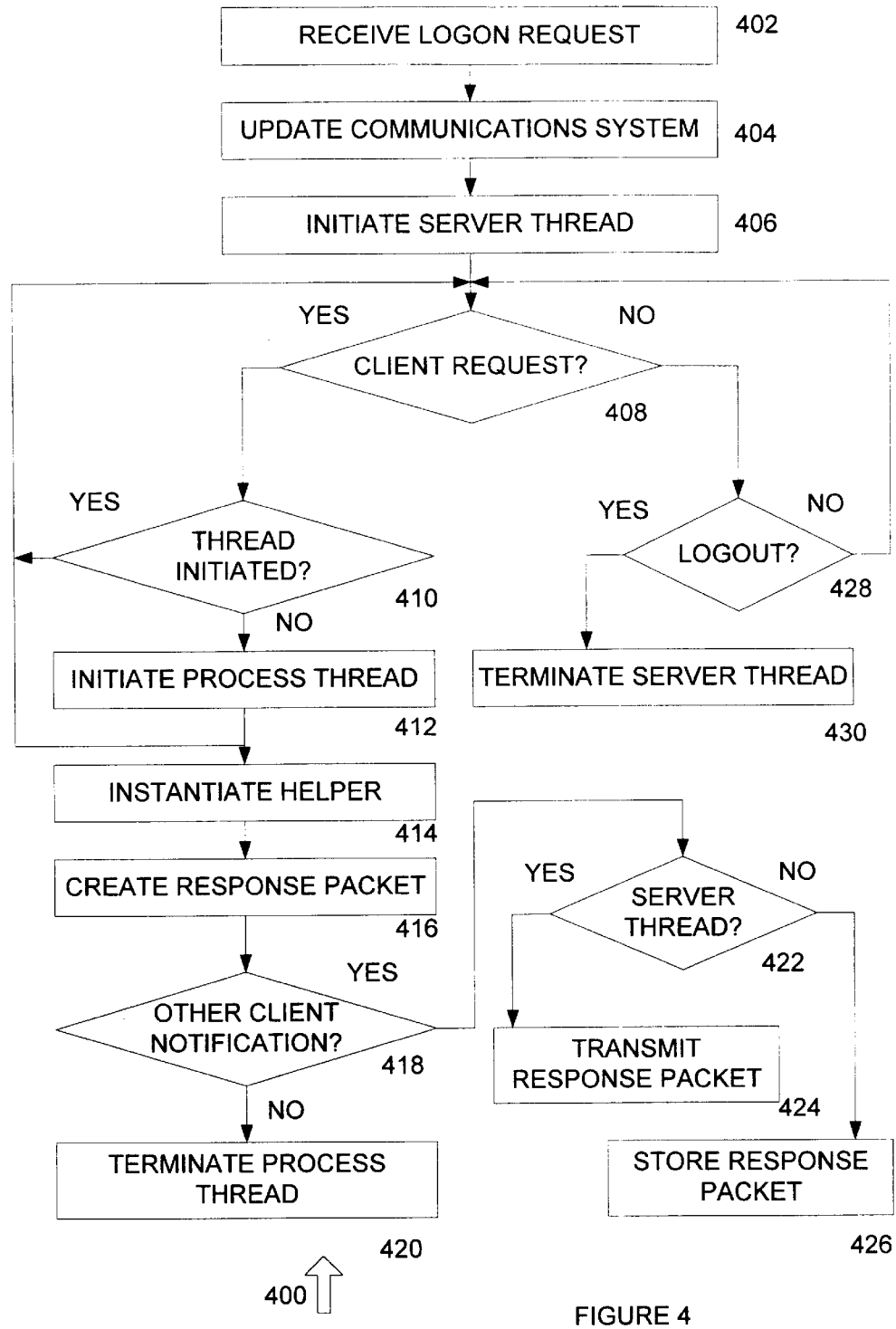
FIG. 4 is a diagram of a method 400 providing client-server communications in accordance with an exemplary embodiment of the present invention.

FIG. 4 is a diagram of a method 400 for providing client-server communications in accordance with an exemplary embodiment of the present invention. Method 400 can be implemented by a server to support communications received from a client and to manage data being communicated to a client, or by other suitable systems and components.

Method 400 begins at 402 where a logon request is received from a client. The logon request is processed to determine whether the client has an account with the server. If no client account is identified, then a client registration process can be implemented, a notice can be transmitted, or other suitable processes can be implemented. The method then proceeds to 404 where the client's communication system is updated. In one exemplary embodiment, the version of communications system software files stored on the client is determined, and an updated version of the software files is then transmitted if the version stored on the client is not the latest version.

The method then proceeds to 406 where a server thread process for the client is initiated. The server thread process is maintained while the client is in communication with the server, and is terminated when the client logs off the server, leaves or otherwise becomes unavailable. The server thread process tracks the process thread processes that have been initiated by the user so that a user state can be determined. In addition, the server thread processes can be used to determine whether a given user is logged on to the system, such that the user can be notified of predetermined events, can be provided with response packets for events that the user did not initiate, or for other suitable purposes.

The method then proceeds to 408 where it is determined whether a client request has been received. If a client request has been received, the method proceeds to 410 where it is determined whether a process thread process has been initiated previously in response to the client request. If a process thread process has been initiated, such as in response to an identical client request that was previously received, the method returns to 408. Otherwise, the method proceeds to 412 where a process thread process is initiated. The process thread process then proceeds in parallel as the method returns to 408 where another client request is awaited.

For the process thread process initiated at 410, the method proceeds to 414 where the process thread process manages one or more helpers that are instantiated to assemble data responsive to the request. The helper can be one of a plurality of helpers that are used for specialized purposes, such as for general ledger functions, purchase order functions, inventory control functions, sales order functions, catalog functions, auction functions, reservation functions, or other suitable functions. The method then proceeds to 416 where a response packet is created based upon data received by the helper. The response packet can also include data for clients other than the one that initiated the request. In one exemplary embodiment, a credit manager client can receive a response packet when a user exceeds a credit limit. Other suitable data can likewise be provided to clients that have not explicitly requested the data.

The method proceeds to 418 where it is determined whether another client should receive the response packet. If it is determined that no other client requires the response packet, the process thread process is terminated and the response packet is transmitted to the client. Otherwise, the method proceeds to 422 where it is determined whether a server thread process is running for that other client. If a server thread process is running, the method proceeds to 424 where the response packet is sent. Otherwise, the method proceeds to 426 where the response packet is stored for subsequent transmission, such as after the client logs on.

If it is determined at 408 that a client request has not been received, the method proceeds to 428 where it is determined whether a logout or logoff command has been received. The logout command can be a command entered by the client, can be a timeout command, or can be other suitable commands. If it is determined that a logout command has not been received, the method returns to 408. Otherwise, the method proceeds to 428 where the server thread process is terminated.

In operation, method 400 allows a server to communicate with a plurality of clients in a manner that allows the state of the client-server communications to be determined. Method 400 further provides a scalable environment for providing server resources whereby a plurality of server thread processes are used to manage a corresponding plurality of clients, and where a plurality of process thread processes are used to manage a corresponding plurality of helper functions that are used to process request packets that are received from the clients. The helper functions receive request data from the clients and generate response data for that client and other clients, where suitable.

Figure 5:
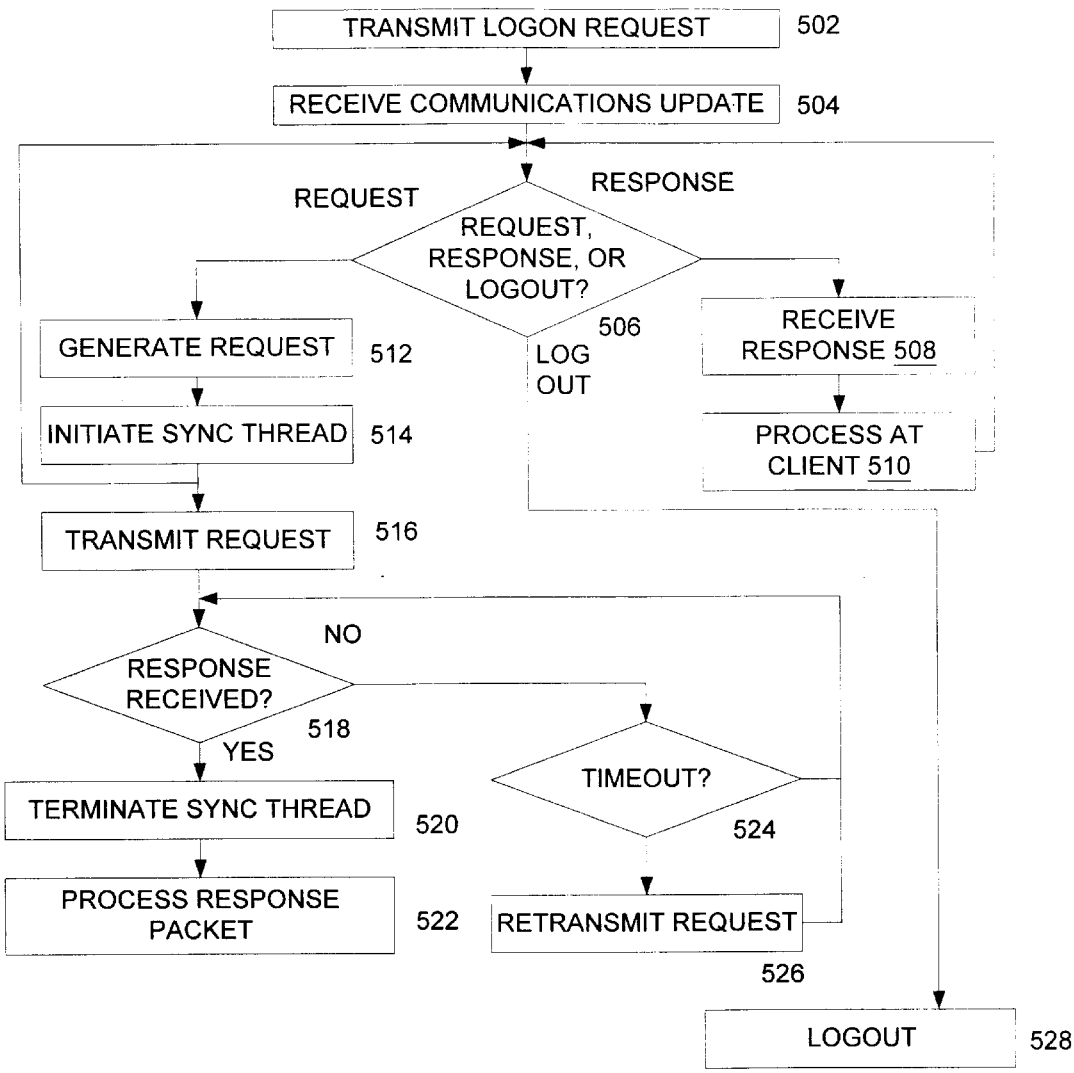
FIG. 5 is a flowchart for method for providing client-server communications from a client in accordance with an exemplary embodiment of the present invention.

FIG. 5 is a flowchart for method 500 for providing client-server communications from a client in accordance with an exemplary embodiment of the present invention. Method 500 begins at 502 where a logon request is transmitted. The method then proceeds to 504 where a communications systems update is received. In one exemplary embodiment, the communications system update can be performed by receiving a request for version data of communications system executable files being used. If more recent versions of the communications system files are available, they are then provided to the client. Other suitable procedures can be used. The method then proceeds to 506.

At 506, it is determined whether a request has been received from the client, whether one or more response packets have been received from the server, or a logout command has been received from the client. If one or more response packets have been received, such as from the server in response to functions performed for other clients, then the method proceeds to 508 where the response data is received at the client. For example, each response packet can include header data, control data, and other suitable data that can be extracted and processed to determine the system operating on the client that should be provided with the data. Each response packet can be processed in other suitable manners, where the processing functionality can be received with the communications system files at 504. The method then proceeds to 510 where the response data is processed by the client.

If it is determined at 506 that a request has been received from the client, the method proceeds to 512 where one or more request packets are generated. For example, the client can include a liaison system that interfaces with client software functionality, and an additional system or systems that provide functionality for transforming requests received from the client software functionality into one or more request packets, each having a standardized request format. The method then proceeds to 514 where a synchronization thread process is initiated. The synchronization thread process is used to keep track of the status of the information request, and also to allow multiple information requests to be simultaneously processed by the client in a manner that prevents response packets from being received in response to the incorrect request or at an incorrect client. The method then proceeds to 516, and returns to 506 where another request can be received and another synchronization thread can be initiated.

For the synchronization thread initiated at 514, each request packet is transmitted to the server at 516, such as through a sender system or other suitable systems. The method then proceeds to 518, where it is determined whether a response has been received from the server. If no response has been received, the method proceeds to 524 where it is determined whether a timeout has occurred. If a timeout has occurred, the method returns to 518. Otherwise, the method proceeds to 526 where each request packet is retransmitted to the server. The method then returns to 518.

If it is determined at 518 that a response has been received, the synchronization thread process is terminated, and the method proceeds to 520 where the response packet data is processed by the client, such as by extracting header and control data from each response packet and performing other suitable processing.

If it is determined at 506 that a logout command has been received, the method proceeds to 528 where logout is performed. Logout can include notifying the server of logout so that the server thread process for the client can be terminated, shutting down the client without notification to the server, or other suitable processes.

In operation, method 500 allows data to be requested and processed at a client, and further allows the client to maintain information regarding the status of the request through the use of multiple synchronization thread processes. Method 500 allows a client state to be maintained at a server, and further allows a client to receive data from a server in response to events occurring at other systems.

Although exemplary embodiments of a system and method for client-server communications have been described in detail herein, those skilled in the art will also recognize that various substitutions and modifications can be made to the systems and methods without departing from the scope and spirit of the appended claims.

What is claimed is:

1. A system for communicating between a client and a server comprising:

a server thread system receiving client logon data and a request packet and managing the client using a server thread process while the client is logged on to the server;

a process thread system coupled to the server thread system, the process thread system receiving the request packet from the server thread system and initiating a process thread process in response to the request packet; and a second client request system determining whether a second request packet is identical to the first request packet from the process thread, ignoring the second request packet if it is identical to the first request packet, and initiating a second process thread process if the second request packet is not identical to the first request packet.

2. The system of claim 1 further comprising one or more helper systems coupled to the process thread system, each helper system receiving helper initiation data from the process thread system and returning response data to the process thread system.

3. The system of claim 1 further comprising a client access system coupled to the server thread system, the client access system providing logon data to the server thread system and receiving communications system files from the server thread system.

4. The system of claim 3 wherein the client access system further comprises a request packet system receiving request data from a client and forming one or more request packets in response to the request data.

5. The system of claim 4 further comprising a listener system coupled to the liaison system, the listener system receiving a response packet from the process thread system and providing the response packet to the liaison system.

6. The system of claim 4 further comprising a sender system coupled to the liaison system, the sender system receiving the request packet from the liaison system and transmitting the request packet to the server thread system.

7. The system of claim 3 wherein the client access system further comprises a synchronization thread system initiating a synchronization thread process when a request packet is transmitted and terminating the synchronization thread process when a corresponding response packet is received.

8. The system of claim 3 wherein the client access system further comprises a request packet system receiving request data from a client and forming one or more request packets from the request data.

9. The system of claim 1 further comprising a response packet system coupled to the process thread system, the response packet system receiving response data, forming one or more response packets from the response data, and providing the response packets to the process thread system.

10. The system of claim 1 wherein the second client request system is a subsystem of the process thread system.

11. A method for communicating between a client and a server comprising:

initiating a server thread process when the client logs onto the server to manage the client connection to the server;

initiating a process thread process in response to a request packet, to manage the generation of a response packet in response to the request packet;

receiving a second client request;

determining whether the second client request is identical to the first client request from the process thread;

ignoring the second client request if it is identical to the first client request; and initiating a second process thread process if the second client request is not identical to the first client request.

12. The method of claim 11 wherein initiating the server thread when the client logs onto the server comprises:

sending a logon request from the client to the server;

determining whether the client requires a communications software update; and transmitting the communications software update if the client requires the communications software update.

13. The method of claim 11 wherein initiating the process thread process in response to the client request further comprises initiating a synchronization thread process at the client when the client request is generated to manage the client request.

14. The method of claim 11 wherein initiating the process thread process in response to the client request comprises:

generating a request packet in response to the client request at the client;

transmitting the request packet to the server; and initiating the process thread process in response to the client request.

15. The method of claim 11 further comprising:

instantiating a helper in response to the client request; and managing the helper with the process thread process.

16. The method of claim 15 further comprising:

generating a response packet;

transmitting the response packet to the client; and terminating the process tl read process when the response packet is transmitted.

17. A method for communicating between a client and a server comprising:

generating a request packet;

initiating a synchronization thread process;

transmitting the request packet to the server;

transmitting a second request packet to the server receiving a response packet in response to the request packet;

receiving no second response packet in response to the second request packet if the second request packet is identical to the first request packet;

terminating the synchronization thread process after receiving the request packet; and terminating a second synchronization thread process after receiving the second response packet if the second request packet is not identical to the first request packet.

18. The method of claim 17 further comprising:

determining that no response packet has been received; and retransmitting the request packet to the server.

19. The method of claim 17 wherein transmitting the request packet to the server further comprises transmitting the request packet to a server thread system.

20. The method of claim 17 wherein receiving the response packet in response to the request packet further comprises receiving the response packet from a process thread system.

* * * * *